United States Patent [19]

Mahgerefteh et al.

[11] Patent Number: 6,081,323

[45] Date of Patent: Jun. 27, 2000

[54] MEASUREMENT OF RAMAN GAIN SPECTRUM IN OPTICAL FIBER

[75] Inventors: Daniel Mahgerefteh, Washington, D.C.; Julius Goldhar, Silver Spring, Md.; Douglas Llewellyn Butler, Painted Post, N.Y.; Lance Gregory Joneckis, Severna Park, Md.

[73] Assignee: The United States of America as represented by the Director of the National Security Agency, Washington, D.C.

[21] Appl. No.: 09/026,429

[22] Filed: Feb. 19, 1998

Related U.S. Application Data

[60] Provisional application No. 60/039,829, Feb. 27, 1997.

[51] Int. Cl.[7] ........................................... G01N 21/00
[52] U.S. Cl. ........................... 356/73.1; 385/122
[58] Field of Search ................. 356/301, 73.1; 359/110, 195; 385/122

[56] References Cited

PUBLICATIONS

Stolen, et. al., "Raman Gain in Glass Optical Wave–guides," Applied Physics Letters, vol. 22, 6, pp. 276–278, Mar. 15, 1973.

Hellwarth, et. al., "Origin and Frequency Dependence of Nonlinear Susceptibilties of Glasses," Physics Review B vol. 11, pp. 964–967, Jan. 15, 1975.

daSilva, et. al., "Comparison of Raman Efficiencies in Optical Fibers," Optical Fiber Conference '94 Technical Digest, WK13, pp. 136 7 1994.

*Primary Examiner*—Frank G. Font
*Assistant Examiner*—Tu T. Nguyen
*Attorney, Agent, or Firm*—Stephen M. Bloor

[57] ABSTRACT

An apparatus and method for measuring the spectral dependence of the Raman gain coefficient in optical fibers is presented. This approach measures the power level of Raman scattering in both a walk-off limited region and a physical fiber length limited region and, from these measurements, extracts the spectral dependence of the Raman gain coefficient. Access to these two regions is accomplished through control of the excitation pulse temporal width and relies on fiber dispersion to separate the excitation light from the Raman scattered light for short pulse widths. This approach measures the spectral dependence of the Raman gain without the necessity of absolute power measurement of the Raman scattered light, the need for a reference standard, or the need of a frequency tunable secondary optical source.

2 Claims, 5 Drawing Sheets

MEASUREMENT OF RAMAN GAIN SPECTRUM IN OPTICAL FIBER

The application claims benefit of Provisional Appl. 60/039,829, filed Feb. 27, 1997.

FIELD OF THE INVENTION

The present invention, an apparatus and method for measurement of the spectral dependence of the Raman gain coefficient in optical fiber, relates to optical measuring and testing, and more particularly, to such measurements in optical fiber.

BACKGROUND OF THE INVENTION

With the development of fiber optic communications systems, fiber based devices, and the optical fiber itself, the measurement of the spectral dependence of the Raman gain coefficient or simply the Raman gain spectrum in optical fiber has become important. Even though most optical communications fiber is made of glass, the Raman gain spectrum of a fiber may differ from the Raman gain spectrum of a bulk sample of the same glass. Glass is doped with chemicals which alter the Raman spectrum and more importantly the doping is not always uniform across the cross-section of the fiber. In determining the spectral dependence of the Raman gain coefficient for a fiber, one must measure the composite effect determined by the overlap of the light intensity profile with the fiber material cross-section. This composite effect is the relevant measurement for applications that use fiber as this is a direct measure of the Raman response of the fiber.

It is important to know the spectral dependence of the Raman gain coefficient, both for evaluating transmission performance in fiber optic communication lines, and for designing devices based on the Raman effect. In communication lines, the Raman effect gives rise to inter-channel cross talk via the coupling of the photonic channels in a wavelength division multiplexed (WDM) transmission line. Raman scattering redistributes the optical power between the photonic channels. Optical power is transferred to a photonic channel via Raman scattering from all photonic channels of shorter wavelength. The strength of this interaction is determined by the value of the Raman gain coefficient corresponding to the frequency difference between the two channels of interest. Because data is encoded on these lines using intensity modulation, Raman scattering is temporally modulated and gives rise to interchannel crosstalk. Assessing the level of the impairment induced by Raman scattering requires knowledge of the spectral dependence of the Raman gain coefficient. Techniques for coping with this type of impairment are limited, and therefore, industry has focused its efforts on engineering fiber types with reduced Raman scattering; hence accurate means for measurement of the Raman gain spectrum are needed.

The measurement of the Raman gain coefficient in fiber based device applications is critical in communications and other areas. Fiber based devices for these applications are desirable because they are inexpensive, compact, reliable, and efficient. In order to maximize that efficiency, the fiber device is often designed to operate at a wavelength corresponding to the peak Raman gain. Measurement of the Raman gain coefficient in optical fiber is important for the design of fibers to be used in 1.3 $\mu$m Raman amplifiers as well as generation of 1.48 $\mu$m light for remote pumping of erbium-doped fiber amplifiers (EDFA). The only other available amplifier that operates at 1.3 $\mu$m is the praseodymium doped fiber amplifier which is inefficient and uses hydroscopic fiber for the host, which is undesirable because of its incompatibility with standard communications fiber and lack of environmental ruggedness. Raman amplifiers are a good alternative to the praseodymium amplifier.

High power 1.48 $\mu$m optical sources are used in situations where supplying electrical power to an EDFA is difficult and the alternative solution of remotely generating the light and delivering it through an optical fiber to pump the EDFA is more desirable. This is expected to be important in festooning applications where two land points are connected by an unpowered undersea fiber cable. A Raman amplifier, built from a segment of the communications line itself, provides distributed amplification as opposed to the lumped amplification provided by an EDFA. This is important in situations where the residual noise level interferes with performance. Applications include upgrading the bit-rate of existing lines and designing ultra-long-haul transoceanic lines.

Because of the inherent high power output, Raman sources are being examined for use in inter-satellite communication links. Where both weight and reliability are central issues, these sources are highly desirable owing to their simple designs and mechanical integrity.

Raman optical sources are also being developed for medical applications where they are expected to be more reliable and less expensive because these Raman sources use fewer parts and are based on inherently more reliable mechanical designs.

Several techniques are currently used to determine the Raman gain spectrum of an optical fiber. Often such determinations are based on the measured value of the Raman scattering cross-section for a bulk (i.e., non-waveguide) sample of the waveguide material and adopted to the fiber environment. This approach has been described by Stolen and Ippen in their paper *Raman Gain in Glass Optical Waveguides*, APPLIED PHYSICS LETTERS, Vol. 22, No. 6, pp. 276–8, Mar. 15, 1973, and uses the technique introduced by Hellwarth, et. al., in *Origin and Frequency Dependence of Nonlinear Optical Susceptibilities of Glasses*, PHYSICAL REVIEW B, Vol. 11, pp. 964–7, Jan. 15, 1975. The accuracy of this technique is limited by the requirement to determine theoretically, or measure experimentally, the optical intensity distribution over the cross-section of the fiber, uncertainties in the dopant profile of the fiber, and limited knowledge of polarization averaging that occurs over long propagation distances. In addition, the measurement of the scattering cross-section requires absolute calibration of the power measurement for the Raman scattered light or a power measurement referenced to a known standard.

Another technique that directly measures the spectral dependence of the Raman gain coefficient in an optical fiber is the pump probe method introduced by Stolen and Ippen in the paper referenced above. This technique employs a conventional pump probe method where the probe light is amplified through stimulated Raman scattering in the presence of the optical pump. This technique relies on the ratio of power measurements of output power level to the input power level of the probe for a known or measured pump level and extracts the gain coefficient based on the assumption of exponential growth of the probe light. This method determines the Raman gain coefficient at the frequency of the probe. Measuring the spectrum requires scanning the probe frequency.

Still another technique for measuring the Raman gain coefficient was proposed by da Silva and Simpson in "*Comparison of Raman Efficiencies in Optical Fibers," OPTICAL FIBER CONFERENCE '94 TECHNICAL DIGEST, WK13, pp. 136–7, and is based on the comparison of the power level of the Raman scattered light from a test fiber relative to the power level from a known reference fiber. This technique eliminates the need for absolute power measurements, but does so by introducing the requirement for a reference standard. This technique measures the Raman gain coefficient at a single point but requires a tunable probe to determine the spectral dependence.

All embodiments of the present invention share a common advantage over the prior art. Our invention uses only a single optical source and, for a sample fiber, it measures simultaneously, and directly, the Raman gain spectrum over all points in the frequency range of interest without the need for either absolute power measurements or a standard reference. By not relying on tabulated or experimentally measured values of the Raman scattering cross-section, we eliminate the uncertainties that arise from the intensity distribution and material composition associated with waveguide geometry when adopting bulk-measured values to the fiber waveguide environment. By not relying on the pump probe approach we eliminate the requirement for a second optical source that is tunable over the frequency range of interest.

Our experimental results may be helpful in fully understanding our invention. Details may be found in "*Technique for Measurement of the Raman Gain Coefficient in Optical Fibers*," OPTICS LETTERS, Vol. 21, No. 24, pp. 2026–8, Dec. 15, 1996, which is incorporated into this specification in its entirety.

SUMMARY OF THE INVENTION

In consideration of the problems detailed above, and the discrepancies enumerated in the partial solutions thereto, an object of the present invention is to measure the spectral dependence of the Raman gain coefficient of an optical fiber directly, without measurement of a bulk-form sample material.

Another object of the present invention is to measure the Raman gain spectrum of an optical fiber directly, while incorporating all chemical doping factors, and birefringent and polarization averaging effects of the sample, in the measurement.

Another object of the present invention is to measure the Raman gain spectrum of an optical fiber directly without requiring the measurement of the absolute power level of the Raman signal.

Another object of the present invention is to measure the Raman gain spectrum of an optical fiber directly using a simple and self-contained instrument.

Another objective of the present invention is to measure the spectral dependence of the Raman gain coefficient simultaneously at all frequency points over the range of interest.

Another objective of the present invention is to reduce the number of required sources from two, as in all of the prior art, to a single optical source.

In order to attain the objectives described above, according to an aspect of the present invention, there is provided an apparatus and method for the measurement of the Raman gain spectrum in optical fiber.

The key to the present invention is that it takes advantage of a difference in the propagation speed between the optical pump, which in our invention is a repetitive pulse train, and the Raman scattered light to provide a convenient method to control the length of interaction between these optical signals. It relies on the fiber dispersion to physically separate the pump from the Raman scattered light. This interaction length is controlled by the selection of the temporal width of the injected pump pulse. Additionally, maintaining a constant peak power, for the pulse, over the measurement sequence, subject to the constraint of constant average pump power, eliminates the need for calibration of the power measurements of the Raman scattered light. The present invention accomplishes this by maintaining constant peak and average power by adjusting the pulse repetition rate inversely with the pulse width.

Our invention provides an apparatus and method for obtaining the spectral dependence of the Raman gain coefficient of the fiber without requiring calibration or absolute measurement of the Raman scattered signal. An optical pump, consisting of Intense square-shaped pulses is injected into a few kilometer of fiber and the average power level of the Raman scattered light over the particular spectral range of interest as a function of pulse width is measured. Since the pump and Raman scattered light are at different wavelengths, they travel at different speeds in the fiber and so have a walk-off limited interaction length. For short pulses the walk-off length, $L_W$, is equal to $\tau/\Delta\beta'$, and is proportional to pulse width, $\tau$, where $\Delta\beta'$ is the inverse group velocity difference between pump and Raman scattered light. As the pulse width increases the interaction length increases until it equals the physical fiber length and the pulses no longer undergo appreciable walk-off. The growth rate of Raman scattered light with pulse width gives the Raman gain coefficient. Also the growth rate at a particular Raman scattered frequency is independent of the gain at other frequencies as long as the pump remains undepleted.

In the undepleted pump approximation and in the absence of loss, the growth of the Raman scattered light is described by $$\frac{\partial I_S(z, t)}{\partial z} = g_R I_S(z, t) I_P(z, t - z\Delta\beta') + \sigma_{eff} I_P(z, t - z\Delta\beta), \quad (1)$$

where $I_P(z, t)$ and $I_S(z, t)$ are the intensity profiles of pump and Raman scattered light, respectively, $g_R$ is the Raman gain coefficient, $\sigma_{eff}$ is the effective spontaneous Raman scattering coefficient, z is the position measured along the fiber longitudinal axis, and t is time. The second term in Eq. (1) describes spontaneous Raman scattering. This equation also neglects dispersion over the bandwidth of the pulses. Integrating Eq. (1) for a square pump pulse, we obtain the average power in the Raman scattered light optical signal at a frequency shift f from the pump:

$$\langle P_S \rangle^{shortpulse} = P_{S0} r \left[ (2 + P_0 g_S L) \frac{(e^{P_0 g_S L_W} - 1)}{P_0 g_S L_W} - (e^{P_0 g_S L_W} + 1) \right]$$

for $L_W \leq L$ and $$\langle P_S \rangle^{longpulse} = P_{S0} r \left[ (2 + P_0 g_S L_W) \frac{(e^{P_0 g_S L} - 1)}{P_0 g_S L_W} - \frac{L}{L_W}(e^{P_0 g_S L} + 1) \right] \quad (2)$$

for $L_W \geq L$.

Here, $$P_{S0} = \sigma_{eff}(f)/g_S(f),$$

$$g_S(f) = g_R(f)/A_{eff}.$$

$P_0$ is peak pump power, L is fiber length, and r is the duty cycle of the pump pulses. Also, for $A_{eff}$, the effective interaction area, $$A_{eff} = \frac{1}{2}\pi(w_P^2 + w_S^2), \quad (3)$$

where $w_P$ and $w_S$ are the mode-field radii of pump and Raman scattered light, respectively. Fiber loss at the pump wavelength can be included to an excellent approximation by the prescription:

$$P_0 L^* \to \frac{P_0(1 - \exp(\alpha L^*))}{\alpha}, \quad (4)$$

where $L^*$ is min(L, $L_W$), and $\alpha$ is the absorption coefficient at the pump wavelength. It can be seen that this is a good approximation by applying it to Eq. (2) and comparing the result to a numerical solution of Eq. (1) that includes loss. Fiber loss at the Raman scattered light frequency gives rise to a multiplicative factor in Eq. (2) as long as the pump remains undepleted.

The states of polarization are not included in Eq. (1). In fact, the Raman gain coefficient for parallel polarizations of pump and Raman scattered light, $g_\parallel$, is much larger than that for perpendicular polarizations, $g_\perp$ in silica-based fiber. Also, the state of polarization of light launched into a standard fiber changes randomly with distance, affecting the measured gain. Nevertheless, if $g_R$ is taken to be an effective gain coefficient, Eqs. (1) and (2) still apply if the fiber is long enough to completely randomize the polarizations of pump and Raman scattered light. The uncertainty caused by polarization effects can be entirely eliminated by using a depolarized source, in which case $g_R$ corresponds to the polarization-averaged gain coefficient.

BRIEF DESCRIPTION OF THE DRAWINGS

Our invention may best be understood when reading the following specification with reference to the accompanying drawings, which are incorporated in and form a part of the specification, illustrate several embodiments of the present invention, and together with the description, serve to explain the principles of the invention. In the drawings.

DETAILED DESCRIPTION OF THE PREFERRED EMBODIMENTS

Figure 1:
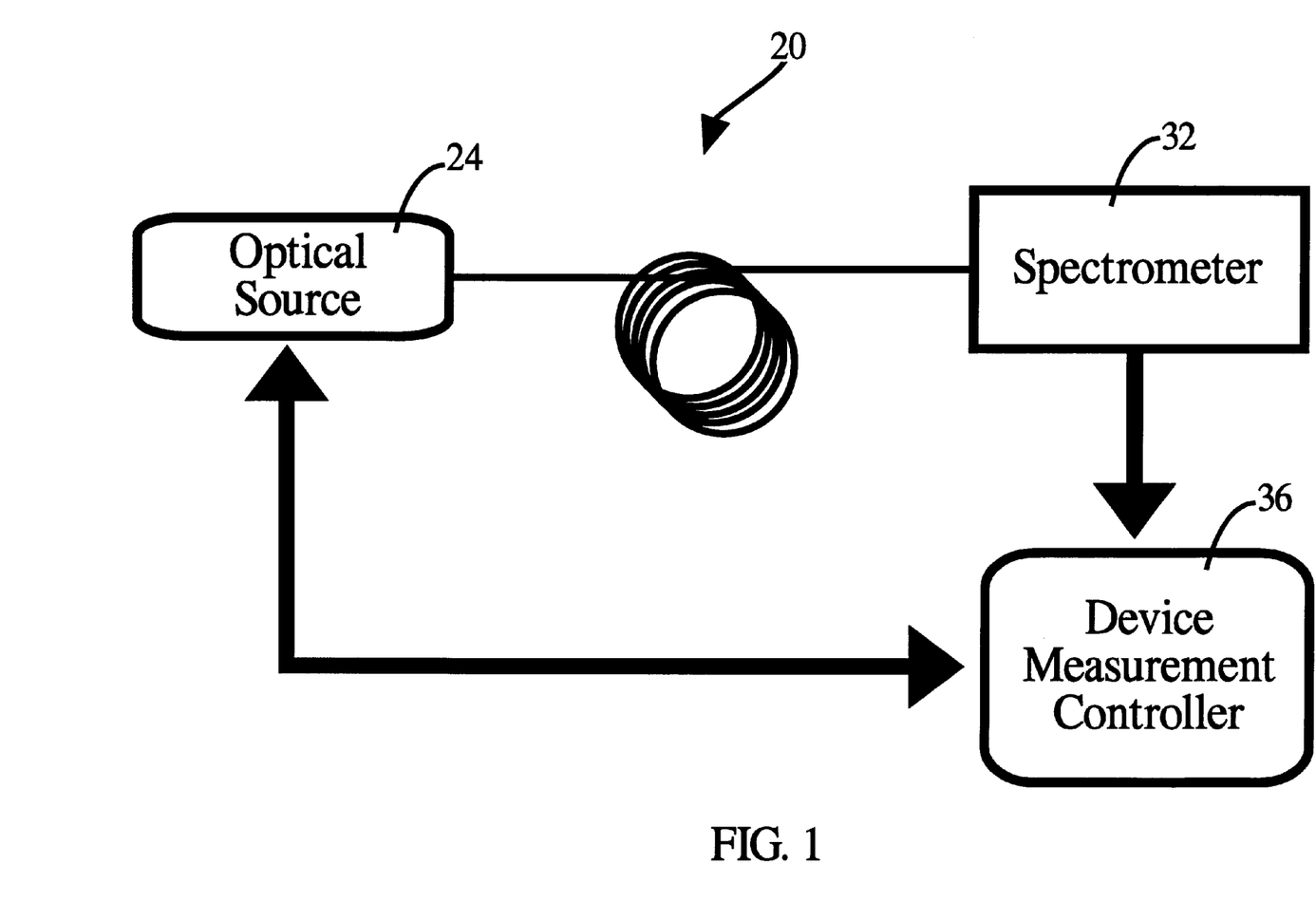
FIG. 1 is a schematic drawing of an apparatus for the measurement of the Raman gain spectrum in optical fiber according to a preferred embodiment of the present invention.

The present invention 20, FIG. 1, measures the spectral dependence of the Raman gain coefficient in single-mode fiber. A controllable optical source 24 produces an optical pulse train of nominally squared-shaped optical pulses of controllable temporal width, repetition rate, and optical power. The determination of the spectral dependence of the Raman gain coefficient is greatly simplified if the pulse train maintains constant peak, $P_0$, and constant average power independent of the pulse width. A means to accomplish this is to vary the repetition rate of the pulse train inversely with the pulse width. This pulse train is launched into the fiber under measurement where it pumps the medium. The pulse train will be referred to as the pump in following discussion.

Throughout this description of the preferred embodiment, reference will be made for purposes of illustration and clarification to the measurement performed on a particular exemplar fiber which is a 10.1 km length of AT&T standard single mode telecommunications fiber. This particular fiber will be referred to as the exemplar demonstration fiber.

A spectrometer 32 measures the optical spectral power density (OSPD) of the Raman scattered light exiting the fiber under measurement for a specific set of pump operational parameters. The light emerging from the fiber under measurement consists of residual pump light and Raman scattered light contained within a spectral range of interest that is down-shifted from the pump. From the measured OSPD data, optical power levels are inferred by choosing a resolution bandwidth that is small compared to the spectral range. The choice of resolution bandwidth will not affect the results provided that it is chosen to be smaller then the spectral widths of any features. Only relative power measurements of the OSPD are required which eliminates any need for calibration of optical power levels for the spectrometer. The measurements on the exemplar demonstration fiber were performed with a resolution bandwidth of 0.1 nm.

A device measurement controller 36 controls the optical source and spectrometer, records the operating conditions and measurements, and analyzes the data to determine the spectral dependence of the Raman gain coefficient.

Figure 2:
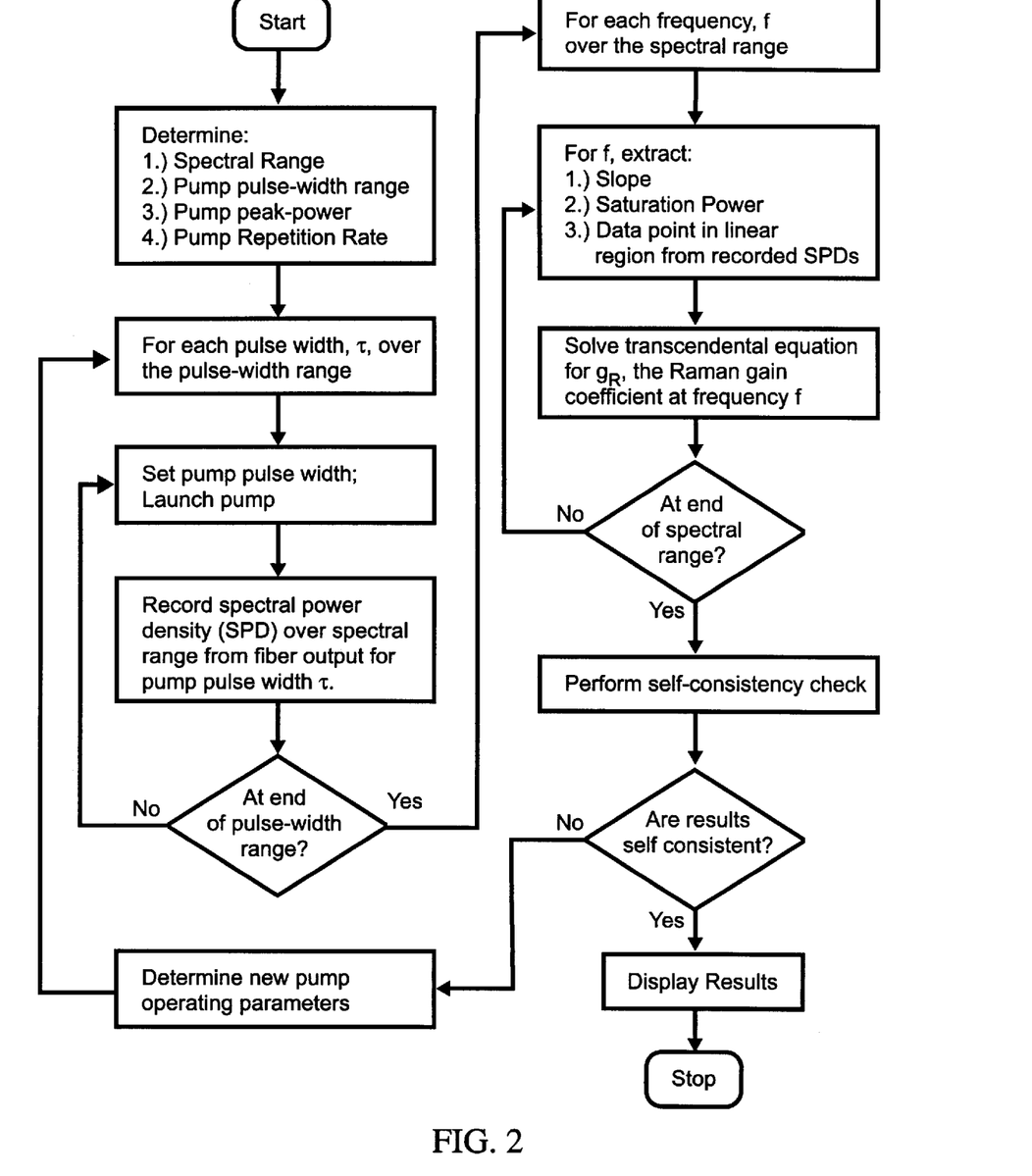
FIG. 2 is a flowchart of a method for the measurement of the Raman gain spectrum in optical fiber according to a preferred embodiment of the present invention.

FIG. 2 presents a flowchart of the measurement process and the various steps will be described in detail in the following.

The first step in this measurement process is to determine the spectral range of interest and the appropriate operating conditions for the optical source. The spectral range of interest depends upon the fiber type. For silica-based optical fiber, the spectral range of interest typically starts at a frequency down-shifted from the pump by approximately 50 THz and ends at the pump frequency. The exemplar demonstration fiber was pumped at 1550 nm and the spectral range extended from 1550 nm to 1690 nm.

Determining the operating conditions for the pump consists of determining a peak power and a pulse width range. The peak power is determined by an estimate of the Raman gain coefficient based on the material composition and fiber geometry. For standard communications type optical fiber, pumped at 1.5 μm, required peak powers are in the range of one to ten Watts. The pulse-width range must include pulse widths sufficient to cover the two cases where the walk-off length, $L_W$, defined as $L_W=\tau/\Delta\beta'$, where $\tau$ is the width of the square pulse, and $\Delta\beta'$ is the inverse of the difference in group velocity between the pump and the Raman scattered light at the frequency difference of interest, is both greater than and less than L, the physical length of the fiber under measurement. These two limiting cases of pulse-width are particularly important for this measurement and the data collected for which the criterion of either one of these cases is fulfilled by the controllable pulse source 24 will be referred to as being in the short pulse or long pulse region, whichever is appropriate. For the exemplar demonstration fiber, a pulse width range extending from 1 ns to 100 ns was sufficient, with the short pulse region extending from 1 to 15 ns and the long pulse region extending from 60 to 100 ns.

Data collection consists of discretizing the pulse-width range into a finite number of temporal pulse widths and for each pulse-width, launching the pulse train into the fiber under measurement and recording the OSPD of the light emerging from the fiber. For a given pulse-width $\tau$, the pulse repetition rate should be set inversely proportional to the pulse-width such that the pump peak power and the average power remain constant. Data collection proceeds until all pulse-widths over the pulse width range have been realized.

Figure 3:
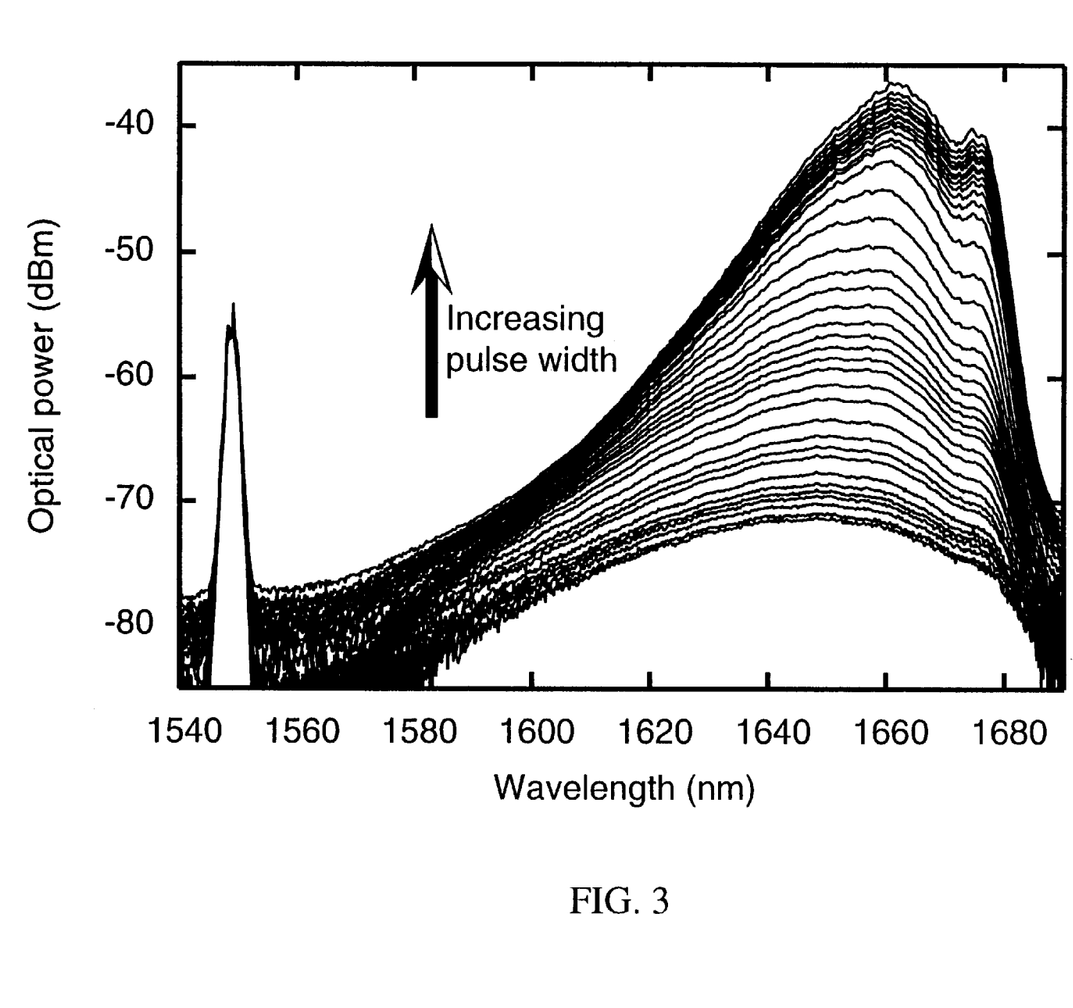
FIG. 3 shows the optical power as a function of frequency for the light emerging from the end of a sample fiber as recorded by the spectrometer with the resolution bandwidth set to 0.1 nm. The peak at 1550 nm is residual pump light and is not part of the Raman scattered light. Each trace is the result for a different pulse width which ranged from 1 to 100 ns. The sample fiber shown is a 10.1 km length of AT&T standard single-mode telecommunication fiber.

FIG. 3 shows the collection of all such measurements for the exemplar demonstration fiber with the resolution bandwidth of the spectrometer 32 set to 0.1 nm.

Analysis consists of discretizing the spectral range into a finite set of frequencies, f, and determining the Raman gain coefficient for each frequency point in the set.

Figure 4:
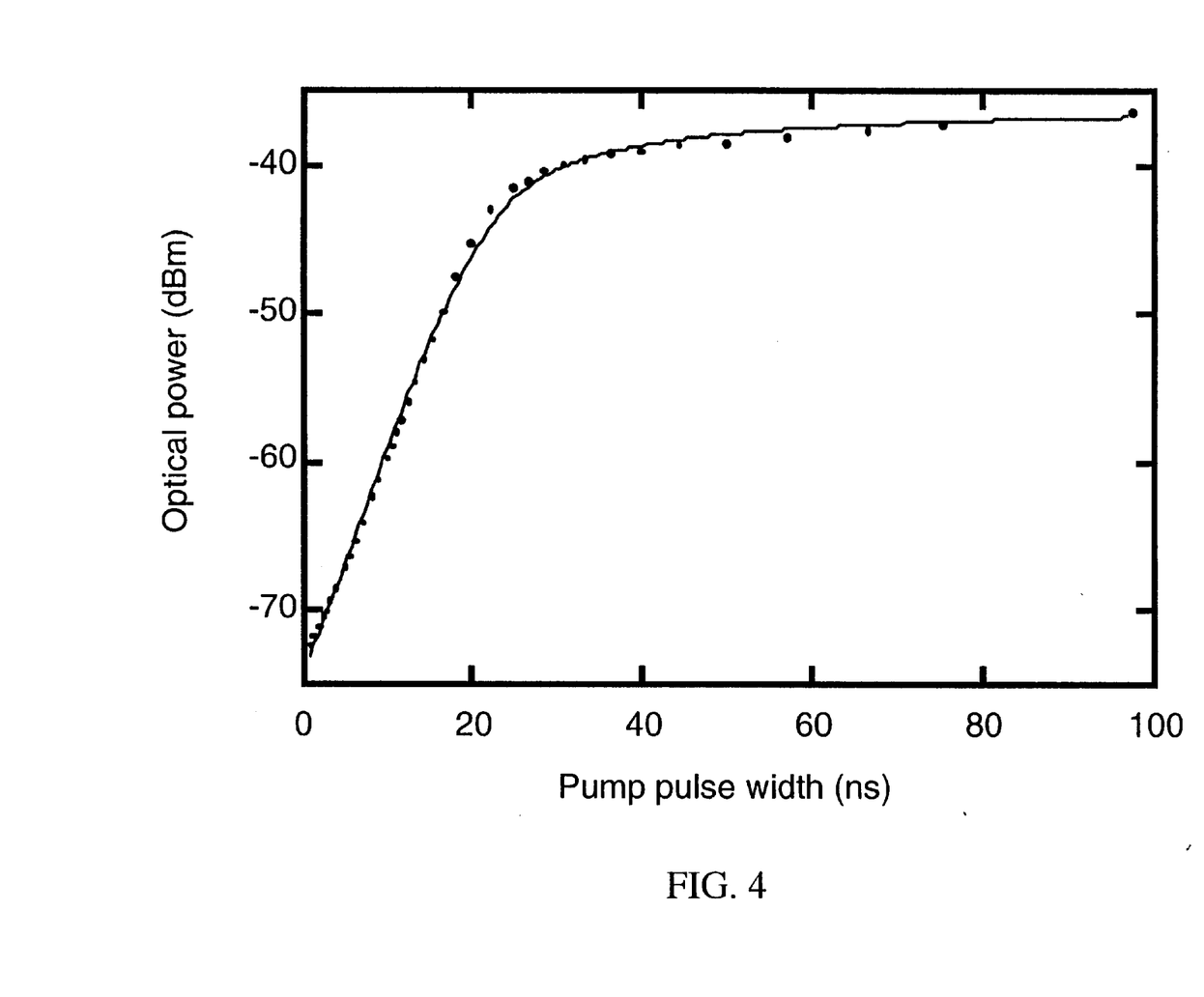
FIG. 4 shows the data from FIG. 3 at the fixed wavelength of 1655 nm over all of the recorded traces spanning the pulse-width range from 1 to 100 ns for the demonstration fiber. The coefficient of Raman gain at a wavelength of 1655 can be determined from this graph by following the procedure described in the text. This procedure is performed on all points contained within the spectral range on interest. The sample fiber used was a 10.1 km length of AT&T standard single-mode telecommunication fiber.

For each frequency point f in the set, using the recorded OSPD data, the relative power, measured in decibels, of the Raman scattered light at frequency f, as a function of the pulse width, is measured. Two physical values are extracted from this measurement. They are $P_\infty[dB]$, the saturation power level of the Raman scattered light in the long pulse-width region, and the slope, s, of the variation of Raman scattered light with pulse width in the short pulse-width region. FIG. 4 shows the optical power of the Raman scattered light at a frequency f corresponding to wavelength 1655 nm for the demonstration fiber, where $P_\infty[dB]=-40$ dBm and s=1.4 dBm/ns.

From $P_\infty$ and s, along with one data point in the linear, walk-off limited region, the Raman gain coefficient is determined using the following procedure.

In the walk-off limited region which occurs for short pump-pulses, the measured power is of the form:

$$P_S[dB]=c+10log[P_0 g_R L]+s\,\tau, \quad (5)$$

where $P_0$ is the peak power of the pump, $g_R$ is the coefficient of the Raman gain at the frequency f, L is the physical length of the fiber, and $\tau$ is the pump pulse width.

Outside of walk-off limited region, the interaction is limited by the fiber length and saturates at, $P_\infty$, such that:

$$P_\infty[dB]=c+P_0 g_R L \quad (6)$$

where c is the same calibration constant previously introduced.

The measured values for the slope, s, the saturation power $P_\infty$, and a data point, $P_S$, in the linear region are inter-related through the transcendental equation:

$$P_\infty[dB]-P_S[dB]=P_0 g_R L-10log[P_0 g_R L]-s\,\tau.$$

This equation is solved yielding $g_R$ the coefficient of Raman gain at frequency f.

This procedure has assumed that linear attenuation at the pump frequency is negligible. If it not negligible, it can be accounted for by replacing the physical length of the fiber, L, with the effective length given by Eq. 4.

This procedure is performed for all frequencies f over the spectral range of interest. Doing so yields the spectral dependance of the coefficient of Raman gain for the fiber under measurement.

Figure 5:
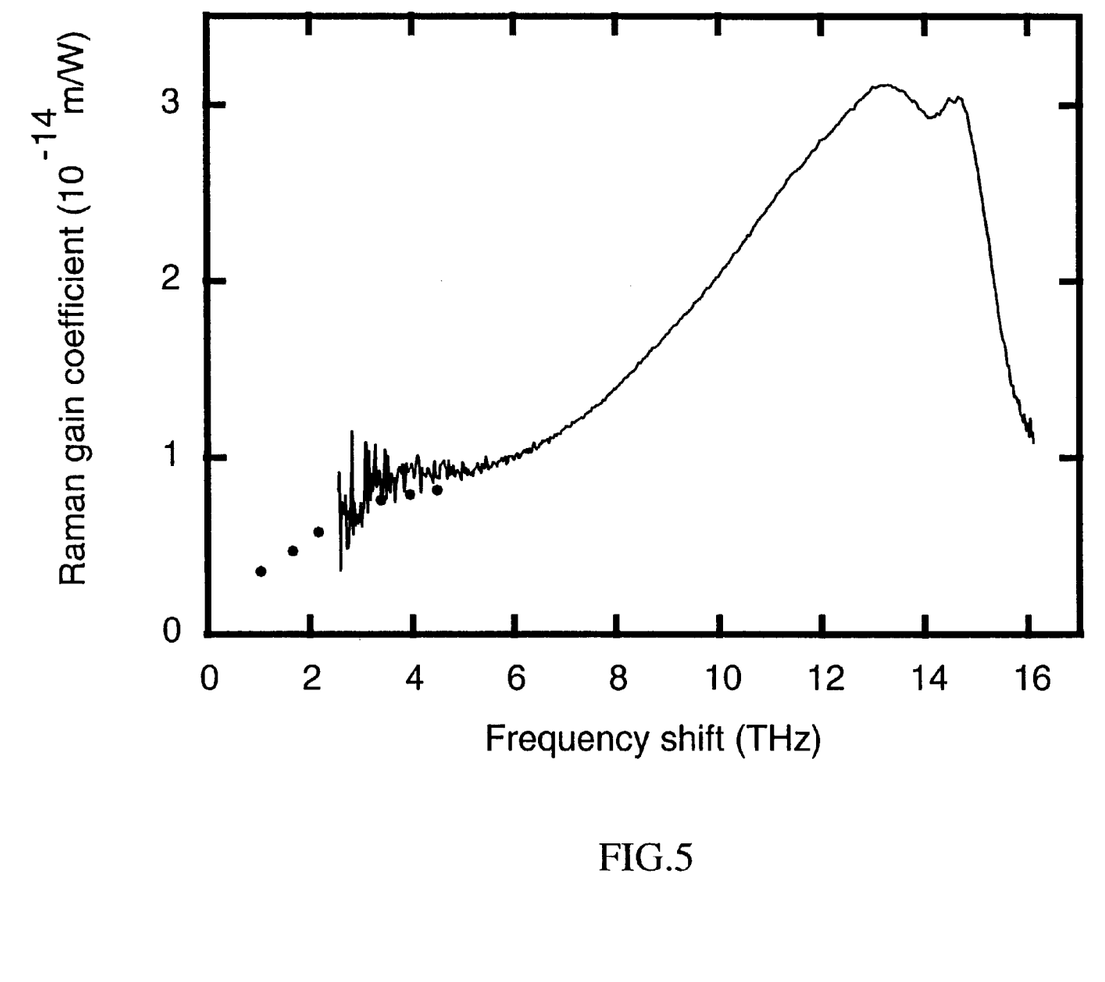
FIG. 5 shows the final result which is the spectral dependence of the coefficient of Raman gain for a sample fiber. The sample fiber used was a 10.1 km length of AT&T standard single-mode telecommunication fiber.

The results obtained by following this procedure for the measurement performed on the demonstration fiber yielded the results displayed in FIG. 5 for values of the coefficient of Raman gain.

The final step is to check the result for self-consistency—namely that the pump has remained in the undepleted region for the entire pulse width measurement sequence. The check is performed by calculating the total fraction of the pump light that has undergone Raman scattering, based on the measured value of the spectral dependence of the Raman gain coefficient. If this fraction is sufficiently small then the results are self-consistent. If not, the measurement should be done again using a reduced pump peak power, $P_O$, until the result is self consistent.

Although various preferred embodiments of the present invention have been described herein in detail to provide for complete and clear disclosure, it will be appreciated by those skilled in the art, that variations may be made thereto without departing from the spirit of the invention or the scope of the appended claims.

What is claimed is:

1. An apparatus for measuring a spectral dependence of a Raman gain coefficient, comprising:

a controllable optical source for producing optical pulse trains having a plurality of nominally square-shaped optical pulses of controllable temporal pulse width, repetition rate, and optical power, over a pulse width range, and means for launching said optical pulse trains into a fiber under measurement such that said optical pulse trains excite the fiber under measurement producing Raman scattered light;

a spectrometer for measuring an optical spectral power density of the Raman scattered light exiting the fiber under measurement over a spectral range of interest; and a device measurement controller having:

a means for causing said controllable optical source to launch into the fiber under measurement a plurality of said optical pulse trains having constant average power and a plurality of temporal pulse widths over said pulse width range, each of said optical pulse trains having a plurality of pulses, each having constant temporal pulse width and constant peak power;

a means for determining a power level of said optical spectral power density of the Raman scattered light exiting the fiber under measurement for long temporal pulse widths of said plurality of pulses and a rate of change of said optical spectral power density of the Raman scattered light exiting the fiber under measurement, for short pulses as a function of pulse width, for said plurality of pulses over said spectral range of interest from said optical spectral power density of said spectrometer; and means for calculating the spectral dependence of the Raman gain coefficient from said power level of said optical spectral power density of the Raman scattered light exiting the fiber under measurement for long temporal pulse widths of said plurality of pulses, said rate of change of said optical spectral power density of the Raman scattered light exiting the fiber under measurement, for short pulses as a function of said plurality of pulses, and said optical spectral power density of the Raman scattered light exiting the fiber under measurement, over said spectral range of interest.

2. A method of measuring a spectral dependence of a Raman gain coefficient, which comprises:

producing optical pulse trains having a plurality of nominally square-shaped optical pulses of controllable temporal pulse width, repetition rate, and optical power, over a pulse width range;

launching into a fiber under measurement a plurality of said optical pulse trains having constant average power and a plurality of temporal pulse widths over said pulse width range, each of said optical pulse trains having a plurality of pulses, each having constant temporal pulse width and constant peak power such that said optical pulse trains excite the fiber under measurement producing Raman scattered light;

measuring an optical spectral power density of the Raman scattered light exiting the fiber under measurement over a spectral range of interest for each of said optical pulse trains;

determining a power level of said optical spectral power density of the Raman scattered light exiting the fiber under measurement for long temporal pulse widths of said plurality of pulses and a rate of change of said optical spectral power density of the Raman scattered light exiting the fiber under measurement, for short pulses as a function of pulse width, for said plurality of pulses over said spectral range of interest from said optical spectral power density; and calculating the spectral dependence of the Raman gain coefficient from said power level of said optical spectral power density of the Raman scattered light exiting the fiber under measurement for long temporal pulse widths of said plurality of pulses, said rate of change of said optical spectral power density of the Raman scattered light exiting the fiber under measurement, for short pulses as a function of said plurality of pulses, and said optical spectral power density of the Raman scattered light exiting the fiber under measurement, over said spectral range of interest.

* * * * *